M. GOHLKE & B. EITNER.
ANTIFRICTION BEARING.
APPLICATION FILED FEB. 2, 1910.
956,700.
Patented May 3, 1910.
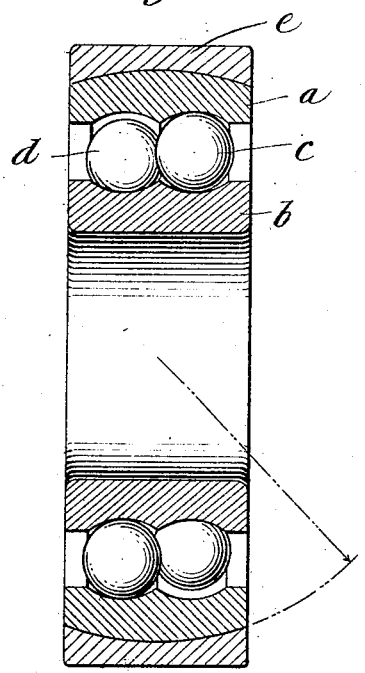
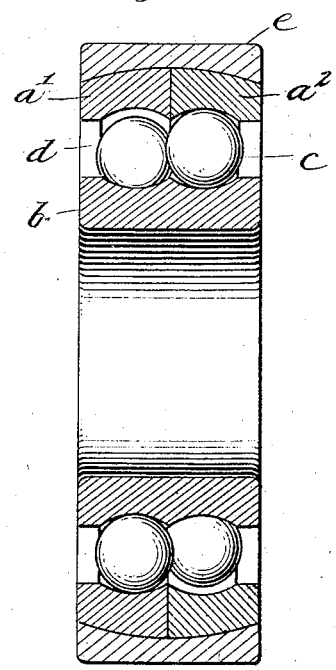
Witnesses:
Inventors
Max Gohlke
Berthold Eitner
By their Attorneys
Rogers & Kennedy

UNITED STATES PATENT OFFICE.

MAX GOHLKE, OF BERLIN, AND BERTHOLD EITNER, OF REINICKENDORF-WEST, NEAR BERLIN, GERMANY.

ANTIFRICTION-BEARING.

956,700.      Specification of Letters Patent.      Patented May 3, 1910.

Application filed February 2, 1910. Serial No. 541,438.

*To all whom it may concern:*

Be it known that we, MAX GOHLKE and BERTHOLD EITNER, subjects of the German Emperor, residing, respectively, in Berlin and in Reinickendorf-West, near Berlin, in the Kingdom of Prussia, Germany, have invented certain new and useful Improvements in Antifriction-Bearings, of which the following is a full, clear, and exact description.

Our invention relates to anti-friction bearings, and more particularly to that class thereof wherein the outer casing member has a convex contour and is located and fits closely in an external casing or ring having a corresponding concavely-formed inner surface.

In ordinary practice, the corresponding concave and convex contours are spherical, and this construction and arrangement are sometimes employed for the purpose of permitting angular variations and adjustments between the parts, as where a shaft or axle is shifted angularly with reference to the supporting means during operation. It is also valuable and advantageous for other reasons. Thus, for instance, the external casing ring may serve as a strengthening or reinforcing means for the outer casing member of the bearing, or may serve to connect and hold the latter together when it is made in a plurality of parts or sections. Again, the external casing ring may be formed with a cylindrical outer surface which adapts it to be inserted into the general and ordinary housing provided for such purpose, and this irrespective of the peculiar or unusual shape given to the outer member of the bearing. Several different methods of introducing such a convex bearing into the concave casing have been used. For instance, the outer cap or casing is sometimes formed in a plurality of sections to permit of assemblage, but obviously the casing is weakened thereby, and it is disadvantageous in other particulars. Another method of obtaining the same result is to form recesses in the edge or edges of the casing or cap of sufficient size to permit the introduction of the bearing into the casing transversely thereto, after which the bearing may be turned pivotally within the casing until its outer spherical contour corresponds with and is contained within the spherically-formed inner surface of the casing.

It is the object of our present invention to obtain all of the advantages involved in the use of such a combined bearing and mounting, and to this end we form the external casing ring with continuous and uninterrupted edges at the sides of its concave surface, and rely on the elasticity of the parts to permit of assemblage and disassemblage by deformation.

More specifically, the bearing is introduced into the external ring transversely thereto, after which it is turned pivotally until it is properly seated therein. It will be obvious that this transverse introduction of the bearing into the ring permits the elasticity of the latter to be availed of to its fullest extent, for the reason that only a portion of the outer bearing member is thus brought into contact with the external ring, and thereby the latter may be readily deformed and elongated to an extent sufficient for the purpose.

We have shown in the accompanying drawing and described in the specification a preferred form of bearing and casing embodying the principles of our invention, but obviously many changes and variations may be made therein without departure from its spirit; and, generally speaking, we do not desire to limit ourselves to any specific forms except in so far as such limitations are specified in the claims.

Referring to the drawing: Figure 1 is a transverse sectional view of a bearing embodying our invention; and Fig. 2 is a similar transverse section of a modified form, wherein the outer casing member of the bearing is constructed in two sections.

The anti-friction bearing may be of any desired or suitable construction and in itself forms no part of the invention. As shown in Fig. 1, it comprises an inner casing member *b*, an outer casing member *a*, and two series of rolling elements or balls *c* and *d* mounted between the casing members. The outer casing member *a* has a spherically-formed outer surface, which corresponds to the spherically-formed inner surface of the cap or casing *e*, wherein it is mounted, the ring *e* being constructed of suitable elastic or deformable material for the purpose subsequently to be set forth, and having substantially continuous and uninterrupted edges at the sides of its concave surface. In order to permit the assemblage of the parts, the bearing is preferably introduced transversely or laterally, for instance at right angles, into the outer casing ring e, which operation as before described causes the distortion of the elastic and deformable ring e, it being thereby elongated in the manner previously referred to. After the bearing is thus partially introduced, it is turned pivotally with reference to the casing ring e until the outer spherical surface of the bearing and the inner spherical surface of the casing correspond, in the manner well understood in the art.

In Fig. 2, we have shown a modified form of our invention, wherein the outer casing member of the bearing is constructed of two separable sections a—1, a—2. In this instance, the bearing is assembled, and the two sections a—1, a—2 thereby brought to proper position, after which the bearing as a whole is inserted within the external casing ring in the manner before described. It will be seen that in this case the external casing ring serves the additional function of holding the sections of the bearing member together, as well as of strengthening the bearing as a whole. It is also to be noted that in both figures the external ring is formed with an outer cylindrical surface, thus adapting it to be inserted in the customary and ordinary housings provided for that purpose.

The parts may be assembled in the manner specified with the minimum of force and distortion, and when assembled, they meet all the requirments of commercial use and practice.

As previously stated, many variations and equivalents will suggest themselves to those skilled in the art without departure from our invention. In the specific description above, we have referred particularly to the elasticity and deformation of the external casing, but obviously similar capabilities and results would be secured, if the outer member of the bearing were sufficiently elastic. In other words, the assemblage or disassemblage may be accomplished by the deformation of either or both of these parts. Further, this means for permitting or facilitating assemblage may be applied in other constructions and is not limited simply to its use with anti-friction bearings, as it might be similarly employed whenever it is desired to introduce a member, formed with a convex contour, within an external casing having a corresponding concavely-formed inner surface.

Having thus described our invention, its construction and mode of operation, what we claim and desire to secure by Letters Patent of the United States is as follows:

1. The combination of an anti-friction bearing having a convexly-formed outer surface with an external casing ring therefor having a corresponding concavely-formed inner surface, the said external ring having substantially continuous and uninterrupted edges at the sides of its concavely-formed surface, and one or both of the parts being sufficiently elastic to permit of assemblage and disassemblage by deformation.

2. The combination of an anti-friction bearing having a convexly-formed outer surface with an external casing ring therefor having a corresponding concavely-formed inner surface, the said external ring having substantially continuous and uninterrupted edges at the sides of its concavely-formed surface, and one or both of the parts being sufficiently elastic to permit of the insertion and removal of the bearing transversely thereto.

3. The combination of an anti-friction bearing having a convexly-formed outer surface with an external casing ring therefor having a corresponding concavely-formed inner surface, the said external ring having substantially continuous and uninterrupted edges at the sides of its concavely-formed surface, and one or both of the parts being sufficiently elastic to permit of assemblage and disassemblage by deformation, and the external casing ring being formed with a cylindrical outer surface.

In witness whereof, we have hereunto signed our names in the presence of two subscribing witnesses.

MAX GOHLKE.
BERTHOLD EITNER.

Witnesses:
 HENRY HASPER,
 WOLDEMAR HAUPT.